(12) United States Patent
Yun et al.

(10) Patent No.: US 8,767,041 B2
(45) Date of Patent: Jul. 1, 2014

(54) METHOD AND APPARATUS FOR PROVIDING 3D STILL IMAGE SERVICE OVER DIGITAL BROADCASTING

(75) Inventors: Kug-Jin Yun, Daejeon (KR); Gwang-Soon Lee, Daejeon (KR); Namho Hur, Daejeon (KR); Jin-Woong Kim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1348 days.

(21) Appl. No.: 12/443,467

(22) PCT Filed: Sep. 21, 2007

(86) PCT No.: PCT/KR2007/004641
§ 371 (c)(1),
(2), (4) Date: Mar. 27, 2009

(87) PCT Pub. No.: WO2008/038961
PCT Pub. Date: Apr. 3, 2008

(65) Prior Publication Data
US 2010/0110162 A1    May 6, 2010

(30) Foreign Application Priority Data
Sep. 29, 2006    (KR) .................. 10-2006-0096581

(51) Int. Cl.
*H04N 13/00*    (2006.01)
(52) U.S. Cl.
CPC ....... *H04N 13/0048* (2013.01); *H04N 13/0059* (2013.01)
USPC ........................................... 348/42; 359/462

(58) Field of Classification Search
CPC ..................... H04N 13/0048; H04N 13/0059
USPC ................................................ 348/42; 359/462
See application file for complete search history.

(56) References Cited

U.S. PATENT DOCUMENTS

2002/0191841 A1    12/2002    Harman

FOREIGN PATENT DOCUMENTS

| EP | 1605615 A2 * | 12/2005 | ............... H04H 1/00 |
| EP | 1605615 A2 | 12/2005 | |
| JP | 9-18829 A | 1/1997 | |
| JP | 09-238367 | 9/1997 | |
| JP | 2002-024237 A | 1/2002 | |

(Continued)

OTHER PUBLICATIONS

Cho et al. "Carriage of 3D audio-visual services by T-DMB", 2006, I EEE, pp. 2165-2168, retrieved on May 16, 2012 from http://www.cecs.uci.edu/~papers/icme06/pdfs/0002165.pdf.*

(Continued)

*Primary Examiner* — Jude Jean Gilles
*Assistant Examiner* — Jaren M Means
(74) *Attorney, Agent, or Firm* — Rabin & Berdo, P.C.

(57) ABSTRACT

A method and apparatus for providing 3D still image service in a specific time interval during audio-visual service of digital broadcast are provided. The method includes receiving a reference image and a 3D supplement image, which construct a 3D still image, through a data channel or a video channel together with a 2D image; restoring the reference image and the 3D supplement image to the 3D still image; and displaying the 3D still image in a specific interval during digital audio-visual broadcast using the 2D image according to display information which includes a play time and a play mode.

22 Claims, 7 Drawing Sheets

(56) References Cited

FOREIGN PATENT DOCUMENTS

| | | |
|---|---|---|
| JP | 2002-135734 A | 5/2002 |
| JP | 2002-142233 A | 5/2002 |
| JP | 2002-171228 A | 6/2002 |
| JP | 2003-333426 | 11/2003 |
| JP | 2004-357156 | 12/2004 |
| JP | 2005006114 A * | 1/2005 ............ H04N 13/00 |
| JP | 2005006114 A | 1/2005 |
| JP | 2005-094168 A | 4/2005 |
| JP | 2005-328482 A | 11/2005 |
| JP | 2006-048418 A | 2/2006 |
| KR | 1995-0010662 | 4/1995 |
| KR | 1999-0060127 | 7/1999 |
| KR | 2000-0057398 | 9/2000 |
| KR | 2005-0087673 | 8/2005 |
| KR | 2005-0111379 | 11/2005 |
| KR | 2006-0108148 | 10/2006 |
| WO | WO-01/52050 | 7/2001 |
| WO | WO-2005/114998 A1 | 12/2005 |
| WO | WO 2005114998 A1 * | 12/2005 ............... H04N 7/08 |

OTHER PUBLICATIONS

Hyun Lee et. al., "A Structure for 2D/3D Mixed Service Based on Terrestrial DMB System", 3DTV Conference, 2007 IEEE, PI, May 1, 2007, pp. 1-4.

Sukhee Cho et. al., "Carriage of 3D Audio-Visual Services by T-DMB'" Multimedia and Expo, 2006 IEE International Conference on, IEEE, PI, Jul. 1, 2006, pp. 2165-2168.

Hur et al., "An HDTV-compatible 3DTV broadcasting system", ETRI Journal, vol. 26, No. 2, Apr. 2004, pp. 71-82.

Nakayama et al., "3D digital broadcasting system and IRD using progressive scanned digital broadcasting", IEEE Transactions on Consumer Electronics, vol. 44, No. 3, Aug. 1998, pp. 1169-1172.

* cited by examiner

```
Contents_type_descriptor
{
        Descriptor_tag(8bits)    : Tag ID
        Descriptor_length(8bits) : INFORMATION LENGTH
        Contents_Format(8bits)   : CONTENTS FORMAT
}
```

| Value | Description |
|-------|-------------|
| 0 | Left frame |
| 1 | Right frame |

FIG. 11

METHOD AND APPARATUS FOR PROVIDING 3D STILL IMAGE SERVICE OVER DIGITAL BROADCASTING

TECHNICAL FIELD

The present invention relates to a method and apparatus for providing 3D still image service over digital broadcasting, by which a 3D still image is played for an advertisement and a specific event to increase an audience effect and an advertising effect This work was supported by the IT R&D program of MIC/IITA. [2005-S-403-02, Development of Supper-intelligent Multimedia Anytime-anywhere Realistic TV (Smart TV) Technology]

BACKGROUND ART

Typically, 3D stereo image includes a reference image and a 3D supplement image having various forms and the two images are respectively converted into left and right images. 3D effect is given by playing these two images on 3D display. Here, the 3D supplement image may be a half of vertical (horizontal) right image, a full right image, another half of vertical (horizontal) image (or a quarter image), or a depth/disparity image. For example, when the 3D supplement image is the half of vertical (horizontal) right image, the reference image and the 3D supplement image are respectively converted to an image having only 3D supplement image odd (even) line data and an image having only even (odd) line data. Then, left and right field images are played to the same place in a scene on 3D display at a time.

In 3D digital broadcasting which developed to be compatible with typical 2D digital broadcasting, the reference image and the 3D supplement image are encoded by an additional encoder and then transmitted. A receiver also needs an additional decoder for these two images. Therefore, for this kind of 3D digital broadcasting, conventional digital broadcasting standard needs to be upgraded and a little complex system needs to be developed.

DISCLOSURE OF INVENTION

Technical Problem

The present invention provides a method and apparatus for providing 3D still image service in specific time interval and maintaining compatibility with existing digital broadcasting that uses a single video codec by providing a 3D still image using a signal video channel and a signal data channel, or using a single video channel.

Technical Solution

According to an aspect of the present invention, there is provided a method of providing 3D still image over digital broadcast. The method includes receiving a reference image and a 3D supplement image, which construct a 3D still image, through a data channel or a video channel together with a 2D image; restoring the reference image and the 3D supplement image to the 3D still image; and displaying the 3D still image in a specific interval during digital audio-visual broadcast using the 2D image according to display information which includes a play time and a play mode.

According to another aspect of the present invention, there is provided an apparatus for providing a 3D still image based on digital broadcast. The apparatus includes a receiving unit receiving a reference image and a 3D supplement image, which construct a 3D still image, through a data channel or a video channel together with a 2D image; a restoring unit restoring the reference image and the 3D supplement image to the 3D still image; and a display unit displaying the 3D still image in a specific interval during digital audio-visual broadcast using the 2D image according to display information which includes a play time and a play mode.

Advantageous Effects

As described above, the present invention enables a 3D still image to be played over a specific event scene like an advertisement in the middle of movie AV service of digital broadcast, thereby increasing audience effects and advertising effects in the digital broadcast. Also, the present invention can be easily applied to various broadcast media such as terrestrial DTV, digital cable TV (DCATV), terrestrial DMB, and Internet protocol TV (IPTV) to provide 3D advertisement, 3D educational material, and 3D instant message service.

BEST MODE

According to an aspect of the present invention, there is provided a method of providing 3D still image over digital broadcast. The method includes receiving a reference image and a 3D supplement image, which construct a 3D still image, through a data channel or a video channel together with a 2D image; restoring the reference image and the 3D supplement image to the 3D still image; and displaying the 3D still image in a specific interval during digital audio-visual broadcast using the 2D image according to display information which includes a play time and a play mode.

According to another aspect of the present invention, there is provided an apparatus for providing a 3D still image based on digital broadcast. The apparatus includes a receiving unit receiving a reference image and a 3D supplement image, which construct a 3D still image, through a data channel or a video channel together with a 2D image; a restoring unit restoring the reference image and the 3D supplement image to the 3D still image; and a display unit displaying the 3D still image in a specific interval during digital audio-visual broadcast using the 2D image according to display information which includes a play time and a play mode.

Mode for Invention

Hereinafter, the embodiments of present invention will be described in detail with reference to two attached drawings.

In digital broadcast, the method of servicing 3D still images can be classified into two major methods according to the type. The first one is a method of servicing 3D still image using a single video channel and a single data channel in digital broadcast. This is method of using a synchronized data stream.

Figure 1:
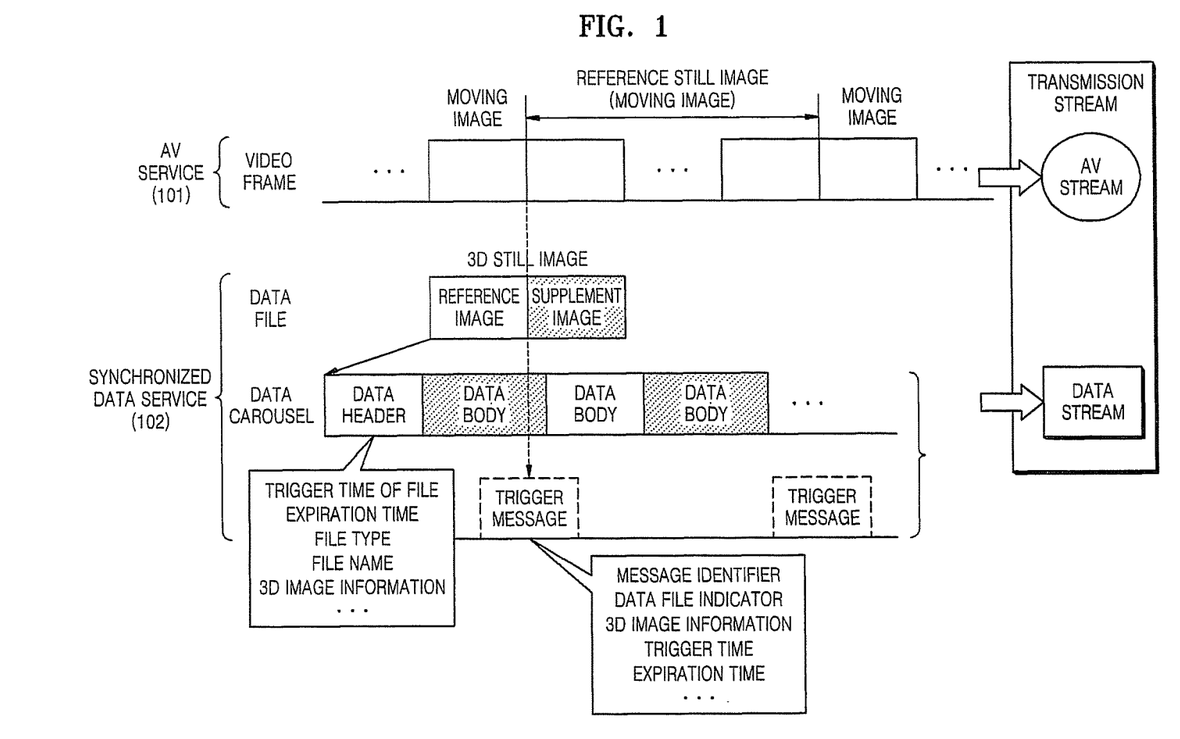
FIG. 1 illustrates a synchronized data stream for 3D still image service in digital broadcasting according to an embodiment of the present invention.

FIG. 1 illustrates a synchronized data stream for 3D still image service in digital broadcasting according to an embodiment of the present invention.

In the current embodiment of the present invention, to provide 3D still image service 102 during an audio-visual (AV) service 101 in digital broadcasting, a reference image which becomes a standard of 3D stereo image is inserted in a specific time interval. The reference image gives a 3D effect for only specific event scene, like advertisement, during broadcasting. The reference image is one of still images or a still image substituting a part of a moving image and is made in advance.

Meanwhile, another supplement image for the 3D stereo image is a still image which is prepared by a receiver as a data file type in advance and is then transmitted with synchronized data service. A data file for a 3D still image includes a reference image and a 3D supplement image. When a 3D still image is constructed only with a data file in a terminal, both of the reference image and the supplement image are used at a time. When the 3D still image is constructed on the basis of the reference image, which is transmitted as the AV service 101, only the supplement image is used out of the data file. As a result, the reference image in the data file should be produced to be the same as the reference still image inserted to the specific time interval in the AV service 101.

Still image service comprises a still image sequence, like a slide show. In other words, a 3D slide show effect may be accomplished by transmitting the 3D still image sequence synchronized with AV service and data service in predetermined time intervals.

To download a data file for a 3D still image to a terminal, the data file is transmitted in a data carousel format defined by various digital broadcasting standards. Here a data carousel is divided into a data header and a data body, each of which is divided into specific block units and then encoded into a data stream. Meanwhile, to provide information about synchronized data service and 3D still image, various kinds of information are produced and then inserted in the data header. Referring to FIG. 1, the data file (i.e., a file object) includes a trigger time indicating the start time of play by a terminal, an expiration time of play of the data file, a file type, a file name, and 3D image information indicating the type of the reference still image and the type of 3D supplement still image.

The trigger time and the expiration time use universal coordinated time (UCT) or both of a presentation time stamp (PTS) and a composition time stamp (CTS), which correspond to the play time of an AV stream, to provide the synchronized data service 102.

In another suggesting method for the synchronized data service 102, data header information may be transmitted in a trigger message which is produced separately. In this method, a data file is downloaded and stored in a terminal in advance and the trigger message is transmitted just before the time when 3D still image service is required.

The trigger message comprises a message identifier which classifies a message, a data file indicator which designates the path of the data file, 3D image information, the trigger time of the data file, the expiration time, and other additional information. The advantage of this method is that the saved data file can be used in repeat during AV service and the trigger message can be transmitted in faster time, whereby accurate synchronization can be accomplished.

An AV stream and a data stream which have been respectively encoded by a AV encoder and a data encoder, which are specified in various digital broadcast the standards, are multiplexed into a transmission stream and are broadcasted after processing of channel encoding and modulation.

Figure 2:
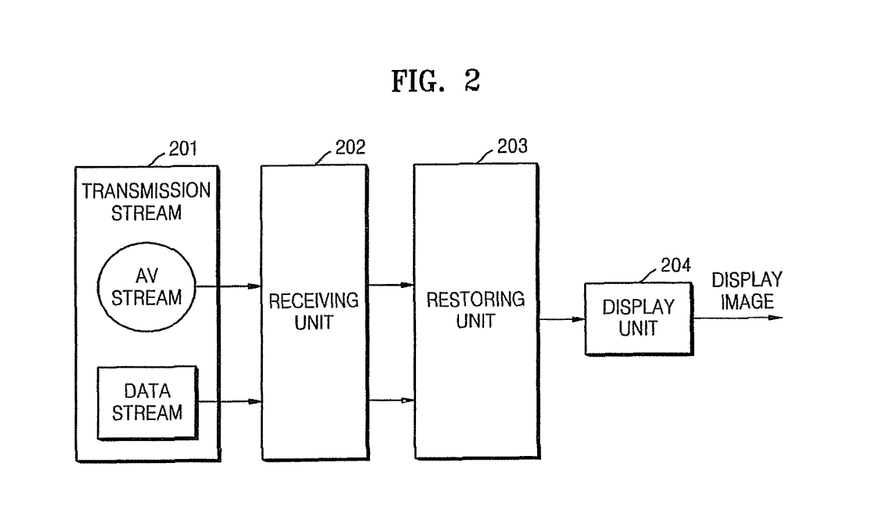
FIG. 2 illustrates an apparatus for providing 3D still image service based on a transmission stream according to an embodiment of the present invention.

FIG. 2 illustrates an apparatus for providing 3D still image service based on a transmission stream according to an embodiment of the present invention.

The apparatus for providing 3D still image includes a receiving unit 202 receiving an AV stream and a data stream, which are transmitted as a multiplexed transmission stream 201, a restoring unit 203 restoring the AV stream and the data stream to 2D AV data and a 3D still image, and a display unit 204 displaying the restored 3D still image in a specific interval during broadcast of the restored 2D AV data. The elements of the apparatus will be described in detail with reference to the drawings below.

Figure 3:
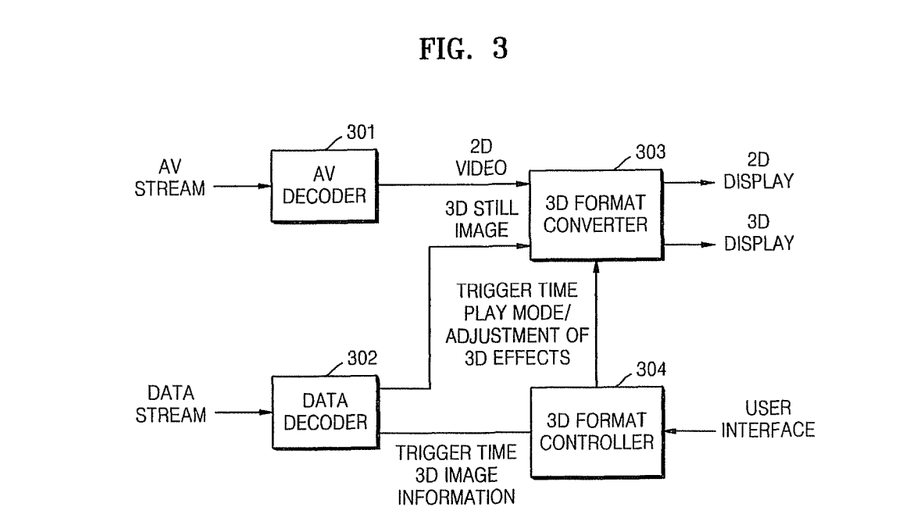
FIG. 3 illustrates the restoring unit illustrated in FIG. 2 according to an embodiment of present invention.

FIG. 3 illustrates the restoring unit 203 illustrated in FIG. 2 according to an embodiment of present invention. The AV stream and the data stream are restored to the transmission stream 201 by channel decoding and demodulating a signal, which is received through a broadcast network. This transmission stream 201 is demultiplexed into the AV stream and the data stream. Thereafter, the AV stream is decoded by an AV decoder 301 and then displayed. The data stream is produced as a still image file for 3D still image service by a data decoder 302 and then stored in a 3D format converter 303.

Also, a data header or trigger message, which comprises various information about time when a 3D image is played and about play mode, is decoded by the data decoder 302, then extracted, and then transmitted to a 3D format controller 304. The 3D format controller 304 determines the play time and play mode of the 3D image using a received trigger time and 3D image information and control a 3D effect using user interface.

Figure 4:
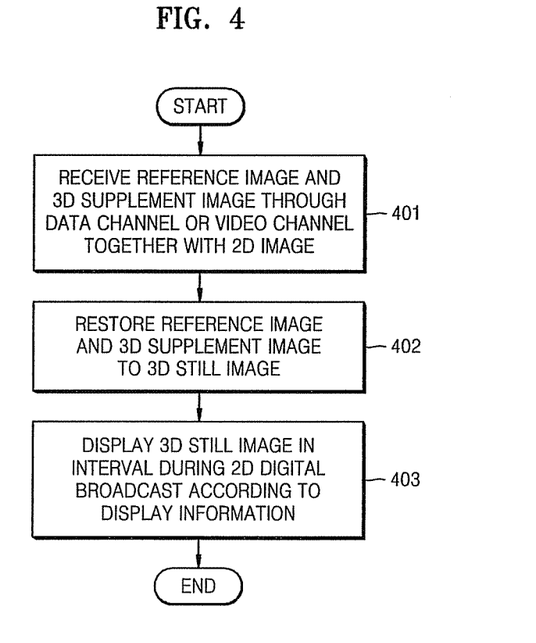
FIG. 4 is a flowchart of a method of providing 3D still image service according to an embodiment of the present invention.

FIG. 4 is a flowchart of a method of providing 3D still image service according to an embodiment of the present invention. In operation 401, a reference image and a 3D supplement image, which construct a 3D still image, are received together with a 2D image through a data channel or a video channel. In operation 402, the reference image and the 3D supplement image are restored to the 3D still image. In operation 403, the 3D still image is displayed in a specific interval during AV digital broadcast of the 2D image, according to display information which comprises play time and play mode.

Figure 5:
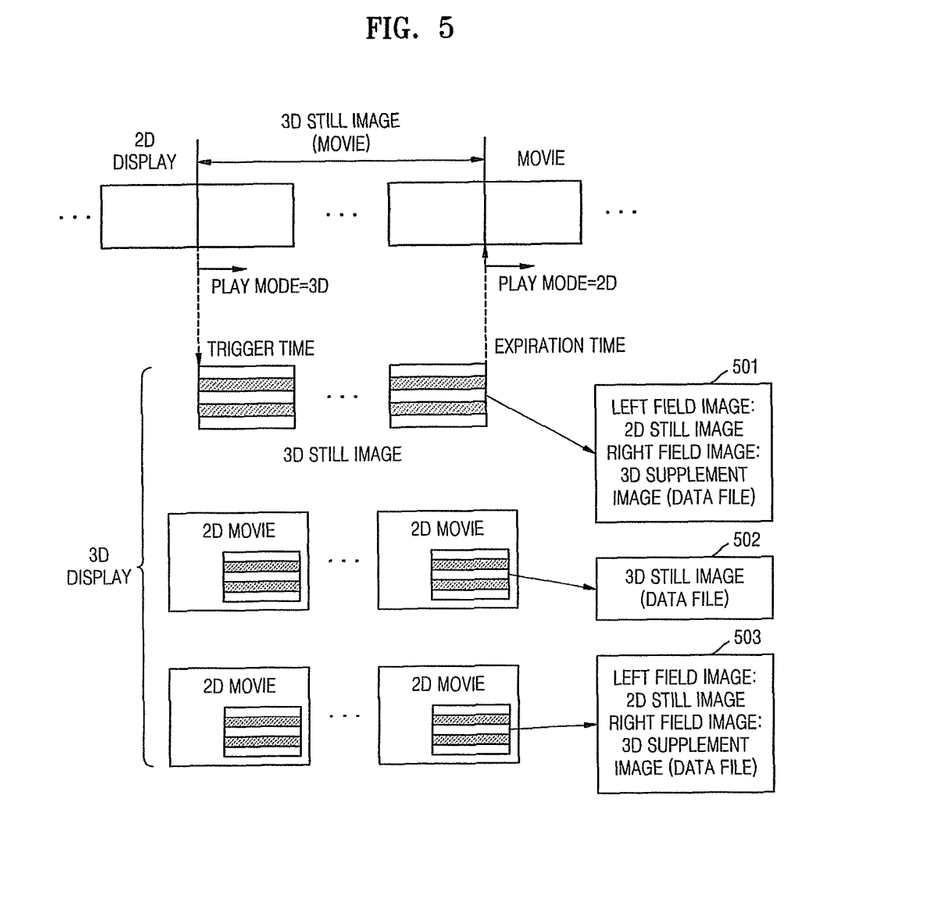
FIG. 5 illustrates a method of displaying a 3D still image during 2D audio-visual (AV) broadcasting according to an embodiment of the present invention.

FIG. 5 illustrates a method of displaying a 3D still image during 2D AV broadcasting according to an embodiment of the present invention.

A 3D still image produced in a 3D format converter should have a different format according to characteristics of 3D display. While a 2D movie is played in the AV service of digital broadcast, a saved 3D still image is displayed at right time of the trigger time when a 3D format controller indicates that a play mode is 3D.

Of course, a terminal having only 2D display plays only 2D images, which are transmitted through AV service, regardless of the play mode. Also, a 3D moving image may be changed at discretion by controlling 3D effect on user interface. Displayed 3D images may be divided into three types depending on the play mode and the user interface.

For a first type 501, a 2D still image transmitted in a specific time interval of movie AV service is set as a reference image (i.e., a left field image) and only a 3D supplement image out of a data file which is transmitted through synchronized data service is set as a right field image so that a 3D still image is displayed on a full screen.

For a second type 502, a 2D moving image transmitted through AV service is played as a background image and a 3D still image transmitted through data service is played onto a partial screen. In this case, a reference image and a 3D supplement still image in a data file are used for the 3D still image at same time.

For a third type 503, a 2D still image in AV service is used as the reference image in the second type 502. In this case, a part of a movie in AV service is made into a still image as the reference image in the data file and transmitted in advance.

Figure 6:
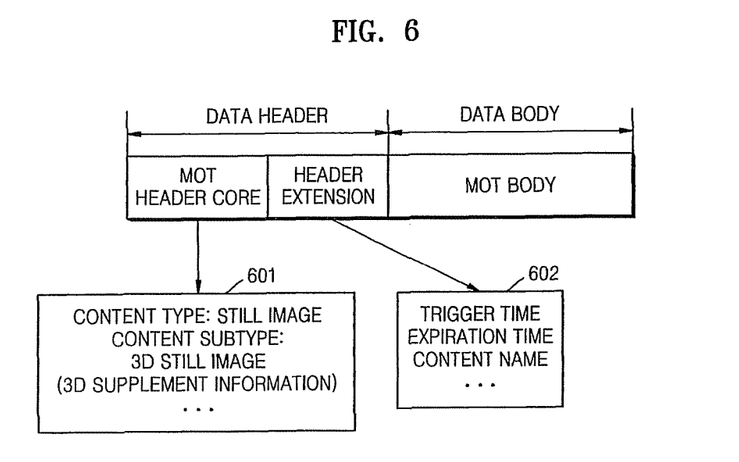
FIG. 6 illustrates the structure of a data carousel in terrestrial digital multimedia broadcast (DMB) according to an embodiment of the present invention.

FIG. 6 illustrates the structure of a data carousel in terrestrial digital multimedia broadcast (DMB) according to an embodiment of the present invention. In the terrestrial DMB, multimedia object transfer (MOT) is used as a transmission protocol for download service of a data file. Accordingly, in the data carousel used in the terrestrial DMB, a data header includes a MOT header core 601 and a header extension 602 and a data body is constructed with a MOT body used in transmission of a real data file.

For data service in the current embodiment of the present invention, a content type is set to a still image in the MOT header core 601. In addition, it is necessary to define a type for a 3D still image in a content subtype.

In the header extension 602, a trigger time and an expiration time, which refer to a play time of a data file, may be set in a UCT format. For fine synchronized data service, the trigger time and the expiration time may be set based on a PTS or CTS corresponding to the play time in AV service. In addition, a trigger message may be transmitted in a packet in a transparent data channel (TDC) corresponding to a data channel of DMB.

There is another method of providing 3D still image service using a single video channel in addition to the above-described method of providing 3D still image service using a video channel and a data channel in digital broadcast.

Figure 7:
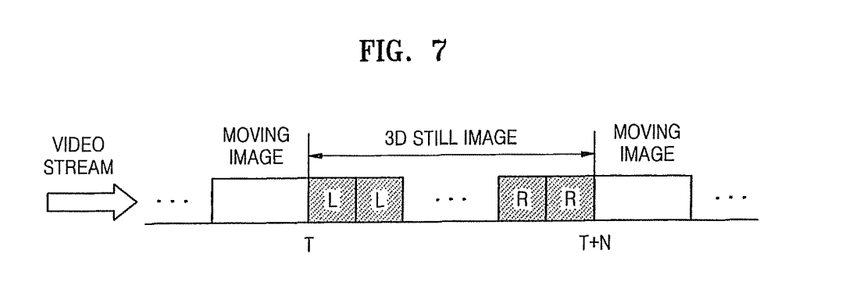
FIG. 7 illustrates a stream in which a 3D still image is transmitted using a single video channel in digital broadcast according to an embodiment of present invention.

FIG. 7 illustrates a stream in which a 3D still image is transmitted using a single video channel in digital broadcast according to an embodiment of present invention. In detail, FIG. 7 shows a video stream in which a 3D still image is provided for a predetermined time from a point T to a point T+N during movie service in conventional digital broadcast. The 3D still image is constructed with a left image and a right image and provides 3D effects to users through the left and right image restored in a receiver. At this time, the 3D still image in the video stream is comprised of a first left (or right) image, a second left (or right) image, . . . a first right (or left) image, a second right (or left) image during a predetermined period of time and is encoded using instruct frame coding. Accordingly, a method according to the current embodiment of the present invention can provide 3D effects for users with compatibility with convention digital broadcast.

Typically, users can recognize information about conventional broadcast content and 3D still image content through a Program System Information Protocol (PSIP). However, a 3D receiver is not able to find out a type of really transmitted content. Hence, in an embodiment of the present invention, a 'version_number' in a program map table (PMT) and a 'contents_type_descriptor' described below are used to distinguish the conventional broadcast content and the 3D still image content in a video channel.

Figure 8:
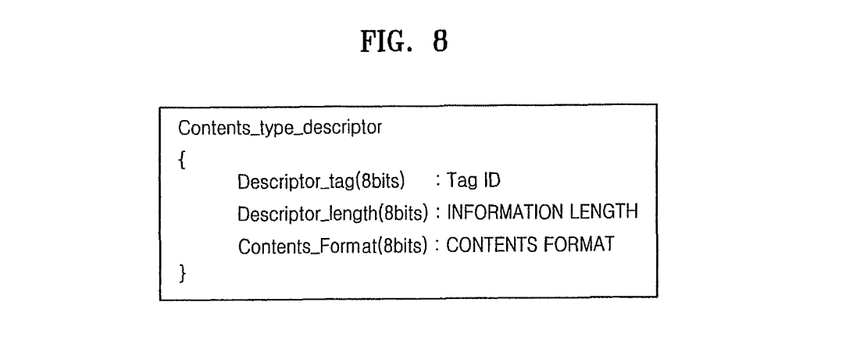
FIG. 8 illustrates a contents_type_descriptor for the recognition of a format of content serviced in digital broadcast according to an embodiment of the present invention.

FIG. 8 illustrates the contents_type_descriptor for the recognition of a format of contents serviced in digital broadcast according to an embodiment of the present invention. For instance, when serviced content is conventional broadcast content, setup is made that 'version_number=0' and 'contents format=10' in the contents_type_descriptor. A certain time after, if serviced content is 3D still image content, the setup is changed like 'contents format=20' in contents_type_descriptor and 'version_number=1'. As such, a 3D receiver can recognize whether the received content is conventional broadcast content or 3D still image content.

At this time, contents format may be extended to distinguish conventional broadcast content and various 3D contents. Also, to inform the beginning of the 3D still image broadcast to the 3D receiver in advance, 'current_next_indicator' in PMT is used. In the case of informing the beginning of the 3D still image broadcast in advance, setup is made that 'contents format=20' and current_next_indicator=0' in contents_type_descriptor and 'version_number=1'. When 3D still image broadcast really starts, the setup is changed like 'current_next_indicator=1'. When a tag value is set to user private in the contents_type_descriptor, compatibility with conventional digital broadcast set-tops can be maintained. The tag value is placed just behind a 'program_info_length' in PMT. And also, with the exception of the above-described additional part, conventional PMT information is used as it is by using the video stream without changing the type.

As described above, the 3D receiver recognizes the 3D still image broadcast through the PMT. In addition, a right image frame and a left image frame, which are included in the video stream to provide 3D effects, are needed to be distinguished.

Figure 9:
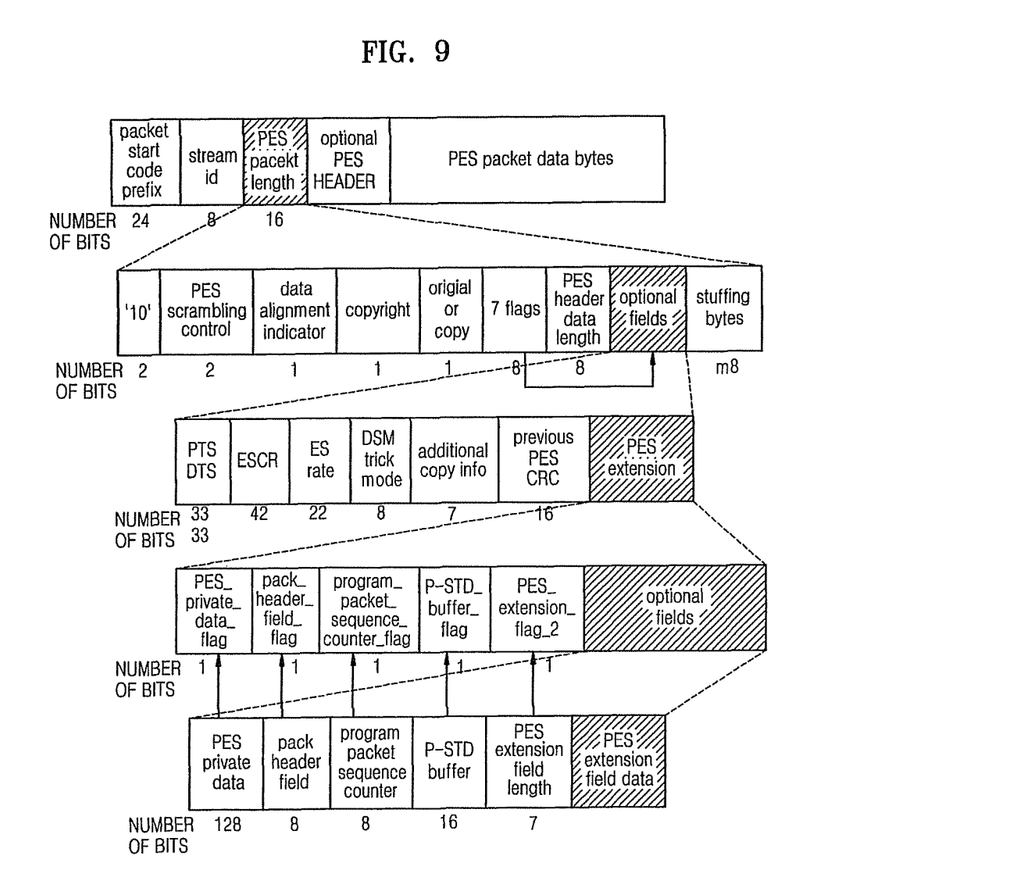
FIG. 9 illustrates the structure of a packetized elementary stream (PES) packet header defined in Motion Picture Experts Group (MPEG)-2 system standards according to an embodiment of the present invention.

FIG. 9 illustrates the structure of a packetized elementary stream (PES) packet header defined in Motion Picture Experts Group (MPEG)-2 system standards according to an embodiment of the present invention.

A 'PES extension' exists in optional fields included in the PES packet header and 'PES extension field data' exists in optional fields included in the 'PES extension'. In an embodiment of the present invention, the PES extension field data included in the PES packet header is used to distinguish between left and right images in an encoded stream with respect to a 3D still image. In detail, a filed value for distinguishing between left and right images is defined in the PES extension field data. Based on the field value, the left and right images are distinguished with respect to the 3D still image.

Figure 10:
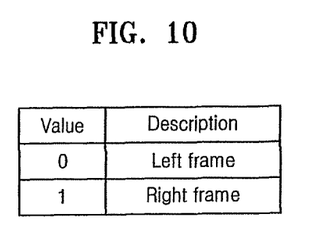
FIG. 10 illustrates field values defined in the PES extension field data to distinguish between left and right images according to an embodiment of the present invention.

FIG. 10 illustrates field values defined in the PES extension field data to distinguish between left and right images according to an embodiment of the present invention. Left and right frames are determined by field values. As such, with respect to a 3D still image, a left image and a right image are distinguished by the field values. The distinguished left and right images are decoded and then transmitted to a 3D format converter to produce a 3D image.

Figure 11:
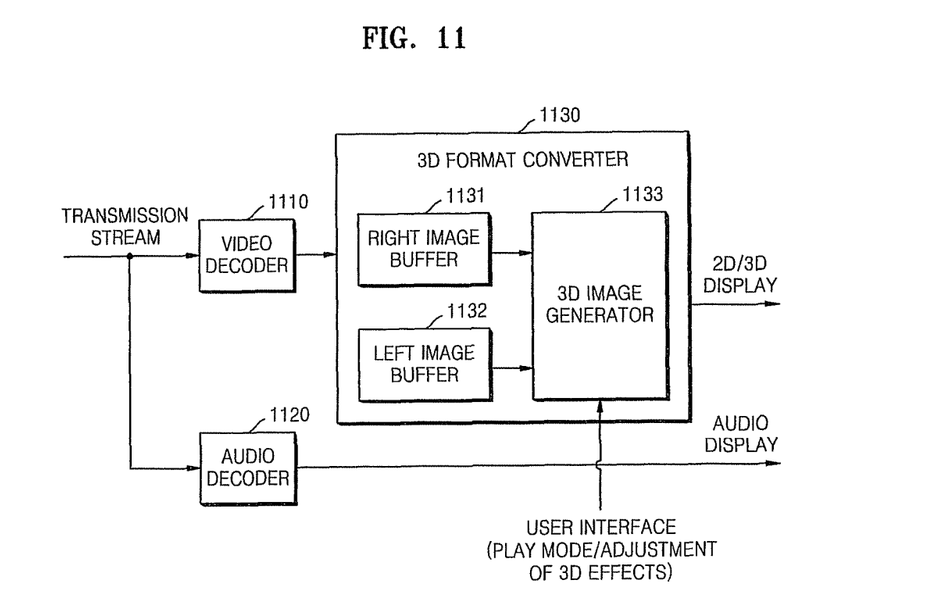
FIG. 11 illustrates a structure for providing 3D still image service through a single video channel according to an embodiment of the present invention.

FIG. 11 illustrates a structure for providing 3D still image service through a single video channel according to an embodiment of the present invention.

A signal, which has been transmitted through a broadcast network, is received and then subjected to demodulation and channel decoding. Through this operation, an AV stream is restored to a transmission stream. Thereafter, the transmission stream is demultiplexed into different streams, which are decoded by a video decoder 1110 and an audio decoder 1120, respectively. At this time, when 3D still image service is provided with respect to video for a predetermined period of time, a 3D receiver's PES packet header is parsed to recognize a left image and a right image and decoded left and right images are transmitted to a 3D format converter 1130.

As illustrated in FIG. 7, according to the structure of the 3D still image, the 3D format converter 1130 stores the decoded left image into a left image buffer 1132. Thereafter, when the decoded right image is received, the 3D format converter 1130 stores the decoded right image into a right image buffer 1131. A 3D image generator 1133 produces a 3D image using both of the left and right images. The 3D format converter 1130 controls 3D effect and conversion between 2D display and 3D display through user interaction using the decoded left and right images in the 3D still image.

The invention claimed is:

1. A method of providing a 3D still image, comprising:
   (a) receiving a reference image and a 3D supplement image, which are restorable to the 3D still image, through a data channel or a video channel, together with receiving a 2D audio-visual stream via the video channel;
   (b) restoring the reference image and the 3D supplement image to the 3D still image; and
   (c) obtaining displaying information including a time interval, displaying the received 2D audio-visual stream and the restored 3D still image in accordance with the displaying information on a display device configured to display both 2D and 3D images, including displaying the 3D still image in the time interval.

2. The method of claim 1, further comprising receiving at least two reference images and at least two 3D supplement images, corresponding to at least two 3D still images, in operation (a), and displaying the at least two 3D still images in a slide show in operation (c).

3. The method of claim 1, wherein the reference image is received through at least one of the data channel and the video channel and the 3D supplement image is received through the data channel.

4. The method of claim 3, wherein, when the data channel is used, a data carousel, which comprises a data header and a data body according to a digital data broadcast standard, is used, and the data header comprises at least one of information for a data synchronizing service and information about the 3D still image.

5. The method of claim 4, wherein a content type that is set to a still image and a content subtype that defines a type of the 3D still image in a multimedia object transfer (MOT) header core are included in a data header in the data carousel which uses a MOT protocol of terrestrial digital multimedia broadcast (DMB).

6. The method of claim 5, wherein a trigger time and an expiration time contained in a MOT header extension of the data header in the data carousel corresponds to a presentation time stamp (PTS) or a composition time stamp (CTS), which indicates a play time in the audio-visual stream.

7. The method of claim 4, wherein the data carousel received through the data channel is restored by a data decoder to the 3D still image and the information about the 3D still image.

8. The method of claim 7, wherein operation (c) comprises displaying the 3D still image onto a full screen of the display device by setting the reference image, which is received through the video channel, as a left image and setting the 3D supplement image, which is synchronized and received through the data channel, as a right image.

9. The method of claim 7, wherein operation (c) comprises playing the 2D audio-visual stream, which is received through the video channel, as a background and displaying the reference image and the 3D supplement image, which are received through the data channel, onto a part of the screen as the 3D still image.

10. The method of claim 7, wherein operation (c) comprises playing the 2D audio-visual stream, which is received through the video channel, as a background and displaying the reference image, which is received through the video channel, and the 3D supplement image, which is received through the data channel, as the 3D still image.

11. The method of claim 3, wherein operation (a) comprises receiving a trigger message, which comprises information for data synchronization and information about the 3D still image, just before the 3D still image is displayed in operation (c) so that the 3D still image, which has been restored and stored, is used repeatedly in response to the trigger message.

12. The method of claim 11, wherein the trigger message comprises at least one of a message identifier, a data file indicator for designating a path of a data file, the information about the 3D still image, a trigger time, and an expiration time which indicate a play time of the data file, and information on a type of the data file.

13. The method of claim 1, wherein, in operation (a), the 3D still image is comprised of a left image and a right image, is encoded using intra-frame coding, and is received through the video channel together with the 2D audio-visual stream.

14. The method of claim 13, wherein operation (b) comprises restoring the 3D still image to a left image and a right image by parsing a packetized elementary stream (PES) packet header of a 3D receiver, and operation (c) comprises restoring the restored left and right images to the 3D still image using a buffer according to a structure of the 3D still image and displaying the 3D still image after processing of display conversion and adjustment of 3D effects.

15. An apparatus for providing a 3D still image, the apparatus comprising;
   a receiving unit receiving a reference image and a 3D supplement image, which are restorable to the 3D still image, through a data channel or a video channel, together with a 2D audio-visual stream via the video channel;
   a restoring unit restoring the reference image and the 3D supplement image to the 3D still image and obtaining displaying information including a time interval; and
   a display unit displaying the received 2D audio-visual stream and the restored 3D still image in accordance with the displaying information, including displaying the 3D still image in the time interval.

16. The apparatus of claim 15, wherein the receiving unit receives at least two reference images and at least two 3D supplement images, corresponding to at least two 3D still images, and the display unit displays the at least two 3D still images in a slide show.

17. The apparatus of claim 15, wherein the receiving unit receives the reference image through at least one of the data channel and the video channel and the 3D supplement image through the data channel.

18. The apparatus of claim 17, wherein, when the data channel is used by the receiving unit, a data carousel, which comprises a data header and a data body according to a digital data broadcast standard, is used, and the data header comprises at least one of information for data synchronizing service and information about the 3D still image.

19. The apparatus of claim 18, wherein a content type that is set to a still image and a content subtype that defines a type of the 3D still image in a multimedia object transfer (MOT) header core are included in a data header in the data carousel which uses a MOT protocol of terrestrial digital multimedia broadcast (DMB).

20. The apparatus of claim 17, wherein the receiving unit receives a trigger message, which comprises information for data synchronization and information about the 3D still image, just before the display unit displays the 3D still image so that the 3D still image, which has been restored and stored, is used repeatedly in response to the trigger message.

21. The apparatus of claim 15, wherein the 3D still image received by the receiving unit is comprised of a left image and a right image, is encoded using intra-frame coding, and is received through the video channel together with the 2D audio-visual stream.

22. The apparatus of claim 21, wherein the restoring unit restores the 3D still image to a left image and a right image by parsing a packetized elementary stream (PES) packet header, and the display unit restores the restored left and right images to the 3D still image using a buffer according to a structure of the 3D still image and displays the 3D still image after processing of display conversion and adjustment of 3D effects.

\* \* \* \* \*